US006804008B1

(12) United States Patent
Morison et al.

(10) Patent No.: US 6,804,008 B1
(45) Date of Patent: Oct. 12, 2004

(54) FIBER OPTIC SENSING INSTRUMENT AND SYSTEM WITH FIBER OF ADJUSTABLE OPTICAL PATH LENGTH AND METHOD OF USING IT

(75) Inventors: W. Don Morison, Mississauga (CA); Gerald Manuelpillai, Ajax (CA); Roderick C. Tennyson, Toronto (CA); Thierry Cherpillod, Maple (CA); Dominic Rouse, Toronto (CA)

(73) Assignee: Fiber Optic Systems Technology, Inc., West Chester, PA (US)

( * ) Notice: Subject to any disclaimer, the term of this patent is extended or adjusted under 35 U.S.C. 154(b) by 15 days.

(21) Appl. No.: 09/987,437

(22) Filed: Nov. 14, 2001

(51) Int. Cl.[7] .................................................. G01B 9/02
(52) U.S. Cl. ...................................... 356/479; 356/497
(58) Field of Search ................................. 356/477, 479, 356/497, 35.5; 250/227.19, 227.27; 358/12

(56) References Cited

U.S. PATENT DOCUMENTS

| 4,443,700 A | 4/1984 | Macedo et al. |
|---|---|---|
| 4,671,659 A | 6/1987 | Rempt et al. |
| 4,749,246 A | 6/1988 | Epworth et al. |
| 4,755,668 A | 7/1988 | Davis |
| 5,012,088 A | 4/1991 | Cole et al. |
| 5,095,514 A | 3/1992 | Curtis |
| 5,218,197 A | 6/1993 | Caroll |
| 5,363,463 A | 11/1994 | Kleinerman |
| 5,394,488 A | 2/1995 | Fernald et al. |
| 5,420,688 A | 5/1995 | Farah |
| 5,444,803 A | 8/1995 | Kim et al. |
| 5,459,570 A | * 10/1995 | Swanson et al. ............ 356/479 |
| 5,473,432 A | * 12/1995 | Sorin .......................... 356/479 |
| 5,557,400 A | * 9/1996 | Sorin et al. ................. 356/73.1 |
| 5,596,409 A | * 1/1997 | Marcus et al. .............. 356/479 |
| 5,657,405 A | 8/1997 | Fujiwara |
| 5,721,615 A | 2/1998 | McBride et al. |
| 5,909,273 A | 6/1999 | Malvern |
| 5,991,479 A | 11/1999 | Kleinerman |

FOREIGN PATENT DOCUMENTS

| EP | 0 357 253 A2 | 3/1990 |
|---|---|---|
| EP | 0 401 576 B1 | 7/1993 |
| EP | 0 499 545 B1 | 4/1995 |
| EP | 0 727 640 A2 A3 | 8/1996 |
| EP | 0 708 913 B1 | 4/1998 |
| EP | 0 840 091 A2 | 5/1998 |
| GB | 2 262 803 A | 6/1993 |
| JP | 62242805 | 10/1987 |
| JP | 01307621 A | 12/1989 |
| JP | 10267707 A | 10/1998 |
| WO | WO 95/02802 | 1/1995 |
| WO | WO 99/22265 | 5/1999 |
| WO | WO 99/60360 | 11/1999 |
| WO | WO/00/00799 | 1/2000 |
| WO | WO 00/00799 | 1/2000 |
| WO | WO 00/39532 | 7/2000 |

OTHER PUBLICATIONS

Application of Optical Fiber Sensor in Civil Structural Monitoring, Daniele Inaudi, Smartec SA, 2001, proceedings of SPIE vol. 4328 (2001) pp. 1–10.

* cited by examiner

Primary Examiner—Samuel A. Turner
Assistant Examiner—Michael A. Lyons
(74) Attorney, Agent, or Firm—Blank Rome LLP

(57) ABSTRACT

An interoferometric fiber optic sensing system uses three optical fibers. A sensing optical fiber is applied to a structure to be monitored to detect displacement or the like by changing its optical path length. A reference optical fiber has a fixed optical path length. An adjustable length optical fiber is controllably adjusted in its optical path length. The three optical fibers form optical paths whose light outputs are caused to interfere. The adjustable length optical fiber is adjusted until an interference fringe appears. The quantity to be detected is derived from the maximum of the interference fringe. Several sensing optical fibers can be multiplexed; by staggering their optical path lengths, their interference fringes can be separated sufficiently to resolve them.

3 Claims, 4 Drawing Sheets

FIBER OPTIC SENSING INSTRUMENT AND SYSTEM WITH FIBER OF ADJUSTABLE OPTICAL PATH LENGTH AND METHOD OF USING IT

FIELD OF THE INVENTION

The present invention is directed to a fiber optic sensing instrument for sensing deflections, displacements, or other physical conditions and more particularly to such a sensing instrument having a fiber of adjustable optical path length, and is further directed to a system and method using such a sensing instrument. The adjustable length can be used for spatial division multiplexing, extending the range of displacements detectable by the sensing instrument, or other purposes.

DESCRIPTION OF RELATED ART

The use of optical fibers to sense deflections, displacements, temperatures and other physical conditions is well known. Typically, such sensors operate by interferometry. An interferometric fiber optic sensing instrument, in its simplest form, operates by splitting light from a light source between two fibers. The first fiber, a sensing fiber, is exposed to the physical condition to be sensed, while the second fiber, a reference fiber, is not. The light passing through the sensing and reference fibers is recombined; if the difference between the optical path-lengths of the sensing and reference fibers is within the coherence length of the light, an interference fringe dependent on the phase difference between the light passing through the sensing and reference fibers can be detected. The physical condition to be sensed causes the sensing fiber to change its optical path length, e.g., by changing its physical length or its index of refraction. A change in the interference fringe allows the computation of a change in the phase difference, which in turn allows the computation of a change in the optical path length experienced by the sensing fiber, which in turn allows the computation of a quantity of the physical condition.

However, the simplest form has the following drawbacks. First, while it can detect a quantity of the physical condition, it is often relevant where along the sensing fiber the physical condition occurs. For example, if a long fiber is used to sense pressure or temperature over an extended area, the simplest form cannot detect the location of the pressure or temperature in the extended area. Second, the range of phase differences must fall within $2\pi$; otherwise, the resulting phase ambiguity renders the detection ambiguous or even meaningless.

To overcome the first drawback, various forms of multiplexing are known. For example, U.S. Pat. No. 4,443,700 to Macedo et al teaches an optical sensing apparatus with multiple sensing fibers spaced along its length. Signals from the multiple sensing fibers are distinguished by their time delays. However, it is necessary to resolve such time delays on the order of a few nanoseconds, thus complicating the device and requiring care in selection of the optical fiber such that the pulse dispersion is minimized.

To overcome the second drawback, U.S. Pat. No. 5,721,615 to McBride et al teaches a fiber optic sensing instrument having a sensor arm and a reference arm. The reference arm has a device having a microscope stage for varying a path difference between the sensor and reference arms. Alternatively, one of the arms can be stretched by a clamp. An interferogram is generated when the path lengths are equal. However, fairly complicated mathematics are used to calculate strain and temperature from the group delay and dispersion as determined from the interferogram.

Smartec SA of Manno, Switzerland, advertises a technology for fiber optic interoferometric measurement known as SOFO. Two optical fibers are installed in the pipe or other structure to be monitored; the first is in mechanical contact with the structure to expand or contract therewith and functions as a sensing fiber, while the second is free and functions as a reference fiber. An analyzer for use with such a sensor also has two optical fibers, one of which has a movable mirror to adjust its optical path length. A modulated signal is obtained only when the difference in optical path lengths between the two fibers in the structure is compensated by the difference in optical path lengths between the two fibers in the analyzer to better than the coherence length of the light source. However, the SOFO system introduces an undesirable complexity in that two fibers must be present in the structure to be monitored. Also, the analyzer of the SOFO system cannot demultiplex and analyze signals from multiple sensors without the use of an optical switch to select the signal from one of the sensors.

SUMMARY OF THE INVENTION

It will be readily apparent from the above that a need exists in the art for a simple way to overcome the above-noted problems with the prior art. It is therefore a primary object of the invention to provide a fiber optic sensing instrument capable of detecting a wide range of phase differences between the sensing and reference fibers.

It is another object of the invention to provide a fiber optic sensing instrument, system and method capable of detecting a wide range of phase differences so as to detect the location of the physical condition being sensed as well as its quantity.

It is another object of the invention to provide a fiber optic sensing instrument, system and method capable of detecting a wide range of phase differences so as to detect a wide range of displacements or other changes in the optical path length in the sensing fiber.

To achieve the above and other objects, the present invention is directed to a fiber optic sensing system incorporating a fiber having an adjustable optical path length. A sensing optical fiber is applied to a structure to be monitored to detect displacement or the like by changing its optical path length. A reference optical fiber has a fixed optical path length. An adjustable length optical fiber is controllably adjusted in its optical path length. The three optical fibers form optical paths whose light outputs are caused to interfere. The adjustable length optical fiber is adjusted until an interference fringe appears. The quantity to be detected is derived from the maximum of the interference fringe. Several sensing optical fibers can be multiplexed; by staggering their optical path lengths, their interference fringes can be separated sufficiently to resolve them.

One embodiment provides a fiber optic interferometric sensing system having a sensing fiber of any arbitrary length used to measure deflections, or displacements, using a mirrored optical fiber (single mode or multimode). This system can include a single optical fiber bonded to, or attached at discrete points to, or imbedded in a structure, of any shape or configuration. Alternatively, the fiber can be fixed at both ends, with no continuous attachment to a structure.

In addition, many such fiber sensors, acting as individual strain sensors, can be optically coupled to a single backbone fiber, provided each sensor length is different (according to criteria described later) to provide a spatial division multiplexing capability.

These sensors measure displacement, from which an average value of strain can be calculated by dividing the measured displacement by the length of the sensor. These sensors can be of any length, typically ranging from a few centimeters to many meters. The combination of sensor lengths that can be incorporated on the same backbone can also vary from very short lengths (ie, several centimetres) to very long gages (e.g.; up to 100 meters for example).

An optical source of short coherence length (such as a light emitting diode) produces a broadband light beam that is split between the optical fiber sensor, a passive reference optical fiber, and an adjustable length optical fiber which can be actuated by various means to extend or contract its length (assuming an initial pre-tensioned state). Each optical fiber has mirrored ends to reflect the incident light beams. The light from the source thus travels two paths that are recombined at a photodetector.

Upon activating the fiber optic sensor (a single mode fiber is preferred due to losses associated with multimode fibers) by means of structural loading, or any means that leads to extension or contraction of the sensor (such as by temperature changes from the installed reference state, for example), the displacement difference between this sensor and its passive reference sensor is measured by adjusting the adjustable optical fiber until an interference pattern is detected by a photodetector. The peak in the interference pattern occurs when the two optical paths are equal.

The adjustable length optical fiber can be adjusted by any suitable technique, such as a motor drive with the fiber wrapped around cylindrical pulleys for example, or a piezoelectric cylinder having the fiber wrapped around its circumference. The length of this adjustable fiber determines the maximum displacement it can measure, as limited by its tensile breaking strength, i.e., the maximum strain or displacement it can undergo as limited by its strength in tension. The longer the optical fiber, the greater the magnitude of the displacement for a given ultimate strain for the fiber material. For example, the typical maximum displacement for a single mode optical fiber of 3 meters length is 60 mm. The rate at which the adjustable optical fiber can be stretched or contracted, determines the system's capability to measure dynamic displacement profiles.

The total displacement range of the adjustable optical fiber allows multiple fiber optic sensors of different lengths to be monitored by the same optical light source and passive reference fiber, provided that the sum of the changes in length of all of the sensors is less than the maximum deflection length of the adjustable optical fiber. Spatial (ie; different length fiber optic sensors optically coupled to a single backbone fiber transmitting the light beam from the light source) division multiplexing can be achieved by altering the lengths of the fiber optic sensors in increments, the sum of which is less than or equal to the length of the passive reference optical fiber minus the sum of the predetermined allowable measured deflections associated with the application of each of the sensors coupled to the optical backbone fiber.

Application examples include, but are not limited to, surface bonding the sensors to pipes, pressure vessels, bridge structures of steel or concrete, or imbedding the sensors in concrete or composites. In these embodiments, the sensors can measure displacements in the form of elongation or contraction, which can be converted to strains in tension or compression. It is envisaged that to measure compression or contraction, the sensors are bonded under a pretension load. This will be important for measuring temperature fluctuations for example, which can be below that of the installation temperature, thus leading to possible thermal contraction of the substrate material, depending on its thermal coefficient of expansion.

Other applications that do not require a continuous attachment to a structure include using the pre-tensioned sensors as deflection measuring sensors between two or more fixed points. Spatial division multiplexing can also be used in this configuration.

A very long gage mirrored fiber optic sensor (consisting of a single mode or multimode fiber) capable of measuring average displacements over any gage length, typically varying from about one meter to over a hundred meters, can be implemented. Applications of very long gage fiber optic displacement sensors include bonding them to long pipeline sections to measure changes in the pipe geometry due to such factors as pressure changes, corrosion leading to wall thinning and radial expansion, cracks or leaks leading to gas/fluid loss. Other applications as long gage displacement measuring devices include monitoring the movement of large structures such as dams, due to movement in the earth/concrete foundation over large distances, vibration and creep behaviour of bridges and buildings. These sensors can be used where electrical and semiconductor based strain gages and vibrating wire gages are too small in length to provide displacement information over long distances, exceeding typically many meters for example.

The invention further includes the instrument itself and the method of using the system.

BRIEF DESCRIPTION OF THE DRAWINGS

A preferred embodiment of the present invention will be described in detail with reference to the drawings, in which.

DETAILED DESCRIPTION OF THE PREFERRED EMBODIMENT

Figure 1A:
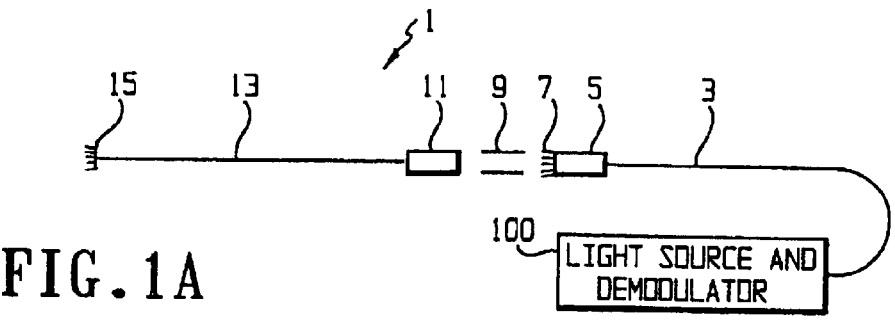
FIGS. 1A and 1B show a schematic diagrams used for explaining principles of operation of the preferred embodiment.

A preferred embodiment of the present invention and variations thereon will be described in detail with reference to the drawings, in which like reference numerals refer to like elements throughout.

FIG. 1A shows a schematic diagram of a sensor for use with the instrument according to the preferred embodiment. The sensor 1 includes a lead fiber 3, preferably a single-mode optical fiber, terminated by a lead ceramic ferrule 5 and a lead mirror 7 formed as a partially mirrored surface on the end of the lead fiber 3. A ceramic sleeve 9 is used to attach the ferrule 5 to another ceramic ferrule 11, which is in turn attached to a sensor fiber 13, which is also preferably a single-mode optical fiber. The sensor fiber 13 ends in a sensor mirror 15, which, like the lead mirror 7, is formed as a partially mirrored surface on the end of the sensor fiber 13. The sensor 1 is connected to an instrument 100 which functions as both a light source and a demodulator.

The sensor 1 is installed such that a change in a physical condition (e.g., deformation) of a structure affects the optical path length of the sensor fiber 13, but not that of the lead fiber 3. Thus, light introduced from the instrument 100 into the sensor 1 takes one of two paths: one from the instrument 100 to the lead mirror 7 and back, and the other from the instrument 100 to the sensor mirror 15 and back. The two paths differ in their optical path lengths by twice the optical path length of the sensor fiber 13. Thus, detection of a change in the optical path lengths provides a determination of the change in optical path length of the sensor fiber 13 and thus of the physical condition of the structure. Accordingly, the optical path length of the sensor fiber 13 is the gage length of the sensor 1.

The instrument 100 will be explained in detail with reference to the block diagram of FIG. 1B and the flow chart of FIG. 2. In the instrument 100 of FIG. 1B, light exits a source having a short coherence length, such as a light emitting diode (LED) 102, and travels via an optical fiber 104 having an optical path length A to a 50/50 coupler 106. The coupler 106 splits the light in two, such that fifty percent of the light is directed through an optical fiber 108 and ultimately discarded and the other fifty percent is directed through the lead fiber 3 of the sensor 1.

The light travels along the lead fiber 3 and through an optional connector 112 and encounters the lead mirror 7. The optical path length up to the lead mirror 7 is B, which, as noted above, is constant. The lead mirror 7 reflects a portion (e.g., 3%) of the light back through the lead fiber 3 and transmits the remainder of the light along the sensor fiber 13, where it encounters the sensor mirror 15 separated from the lead mirror 7 by an optical path length C, which, as noted above, defines the gage length of the sensor 1. Thus, the light returning along the sensor 1 has two components whose optical path lengths are 2B and 2B+2C, respectively; that is, they differ by 2C.

As noted above, the optical path length C varies in accordance with a value of the physical condition. The goal is to determine C and thus the quantity of the physical condition.

Both of those components of the light pass again through the coupler 106. Fifty percent of the light travels toward the LED 102, where it is lost. The other fifty percent travels along an optical fiber 118 having an optical path length D to a second 50/50 coupler 120, which divides the light between an optical fiber 122 having an optical path length E and an optical fiber 124 having an optical path length F.

The optical fiber 122 is called the adjustable-length optical fiber because the optical path length E of the optical fiber 122 is controllable. In some embodiments, the optical path length E is changed by changing the physical length of the fiber 122. For instance, the fiber 122 can be stretched between an anchor 126 and an actuator 128. Other techniques for changing the optical path length E will be described below. The optical fiber 122 ends with a mirror 130, so that the light passing through the fiber 122 travels by an optical path length 2E. The total variation in E is greater than the coherence length of light from the light source.

The optical fiber 124 is called the passive reference fiber because its optical path length F is fixed and is used as a reference value in the determination of C. Since the optical fiber 124 ends with a mirror 134, the light passing through the fiber 124 travels by an optical path length 2F. The fiber 124 can also include a connector 134, which should preferably have optical characteristics identical to those of the connector 112.

The light reflected by the mirrors 130 and 132 is recombined in the coupler 120. The recombined light travels through an optical fiber 136 having an optical path length G to a photodetector 138.

The sensor 1 and the instrument 100 provide four possible paths for the light emitted by the LED 102, since the light can be reflected from the mirror 7 or 15 and then from the mirror 130 or 132. The first path involves the mirrors 7 and 130 and has an optical path length A+2B+D+2E+G. The second path involves the mirrors 15 and 130 and has an optical path length A+2C+2B+D+2E+G, or the first optical path length plus 2C. The third path involves the mirrors 7 and 132 and has an optical path length A+2B+D+2F+G. The fourth path involves the mirrors 15 and 132 and has an optical path length A+2B+2C+D+2F+G, or the third optical path length plus 2C.

The terms A+2B+D+G are common to all four paths. If those terns are eliminated, the remaining terms are:

First path, 2E
Second path, 2C+2E
Third path, 2F
Fourth path, 2C+2F.

Thus, the goal becomes that of deriving changes in C from the known quantity F and the controllable quantity E.

Only the second and third paths are involved in producing an interference fringe at the photodetector 138. The interference fringe is maximized when those path lengths become equal, namely, when 2C+2E=2F, or 2C=2F−2E. The adjustable length optical fiber 122 is adjusted until that condition is reached, as determined by observation of the interference fringe detected by the photodetector 138. Then, changes in C can be derived from the fixed quantity F and the value of E needed to maximize the interference fringe:

$$C=F-E. \qquad (Eq. 1)$$

In other words, the actuator 128 is actuated until the difference in path lengths between the mirrors 130 and 132 equals the difference in path lengths between the mirrors 7 and 15.

For instance, when the sensing fiber 13 is bonded to a structure (FIG. 2, step 202), it will be at a rest position in which C has an initial value LS1. As the structure deforms, C reaches a new value LS2. In other words, the sensing fiber 13 experiences a displacement LS2−LS1. Similarly, when the adjustable fiber 122 is in its rest position, the difference F−E between the optical path lengths of the fibers 124 and 122 has an initial value LR1. During sensing, light is applied to the fibers 3, 13, 122 and 124 (FIG. 2, step 204), and an output is detected at the photodetector 138. The actuator 128 adjusts the optical path length of the fiber 122 (FIG. 2, step 206) until the interference fringe is detected (FIG. 2, step 208). The interference fringe is maximized when the path difference between the fibers 124 and 122 reaches a new value LR2 which is equal to LS2. Then, in FIG. 2, step 210, C can easily be determined. Then the sensing process ends in step 212.

Figure 1B:
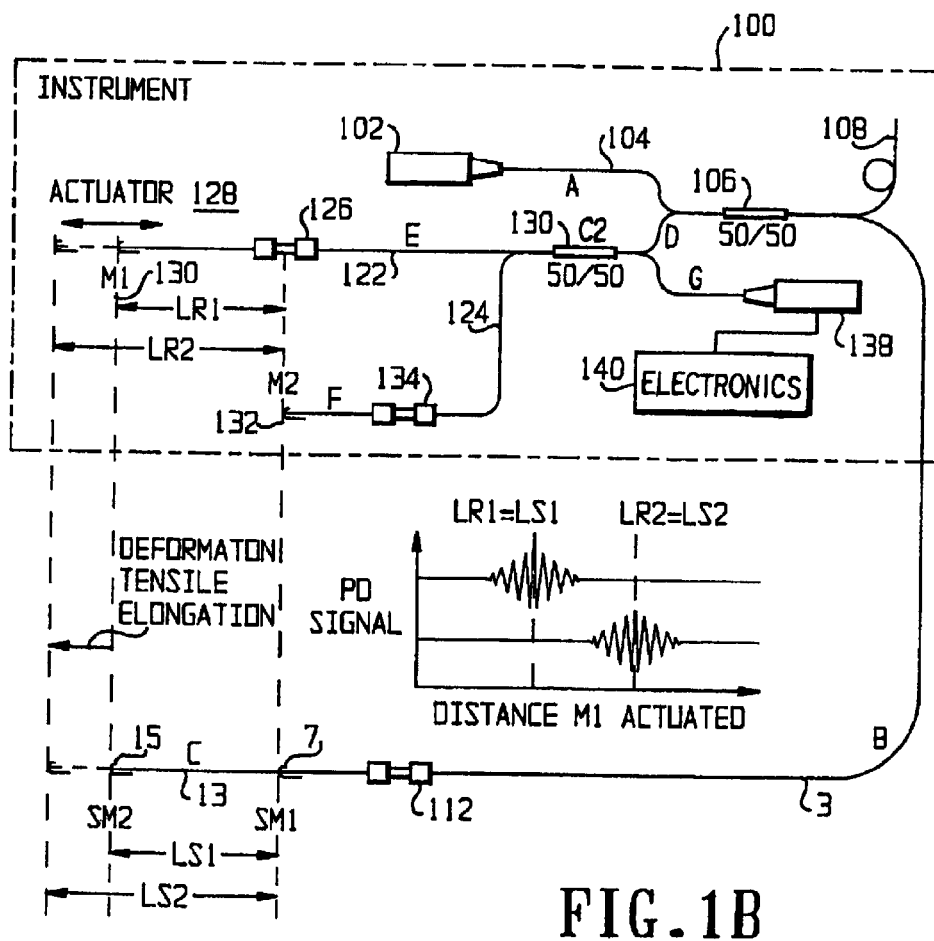
Figure 2:
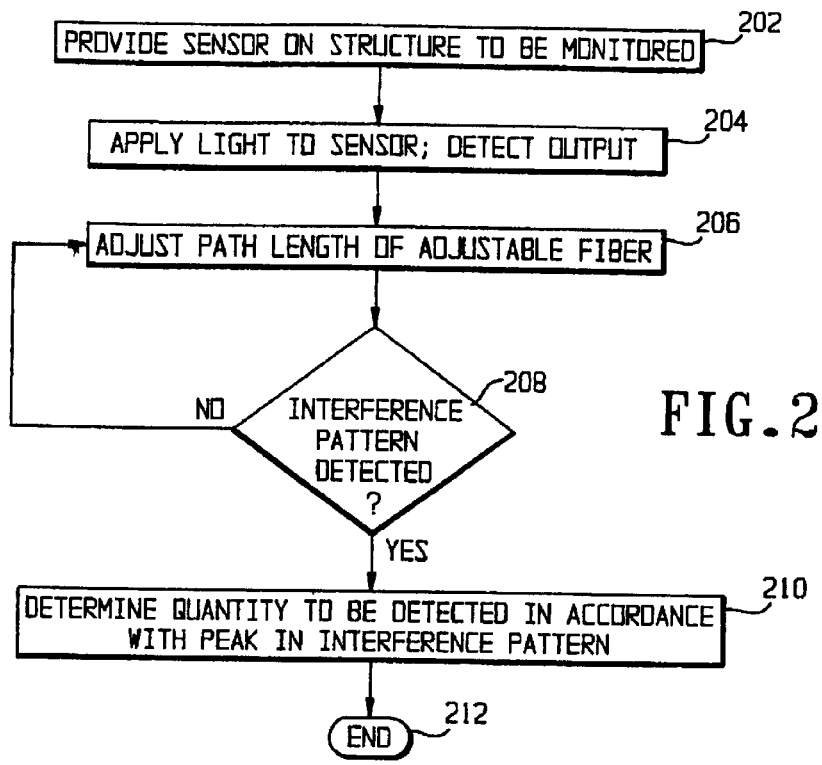
FIG. 2 shows a flow chart used for explaining the principles of operation of the preferred embodiment.

FIG. 1B also shows a plot of the signal output by the photodetector 138, showing the resultant interference fringes.

The above is easily generalized to a sensor having multiple sensing fibers with path lengths C, C1, C2, etc. A single adjustable fiber and a single reference fiber can be used, and as the adjustable fiber is adjusted, a series of interference fringes will appear, one for each of the multiple sensing fibers. The fringes have peaks when LR2−LR1=0, C1−C, C2−C, . . . . If those peaks occur in mutually exclusive ranges, spatial division multiplexing is possible, and the various sensing fibers can be resolved without the need in the prior art to resolve nanosecond differences in time between pulses or to provide an optical switch to select a signal from one of the sensors.

The sensor 1, in combination with the instrument 100 or another suitable instrument, can be used to detect static or dynamic conditions. For dynamic conditions, the frequency which can be detected is limited only by the time needed to adjust the adjustable fiber.

The optical fibers are preferably single-mode fibers to reduce losses. The actuator 128 has a suitable way of determining the degree of actuation so that E can be determined. For example, if the actuator 128 is mechanical, a mechanical encoder can be used, while if the actuator 128 is piezoelectric, E can be derived from the voltage required to maximize the interference fringe.

Any suitable electronics 140 can be used to receive the signals from the photodetector and locate the interference maximum. The electronics can locate the maximum automatically or operate under manual control.

The sensor 1 can be implemented as a long-gage optical fiber sensor. The sensor 1 can be placed in or on an object whose physical condition (e.g., displacement) is to be sensed.

Figure 3A:
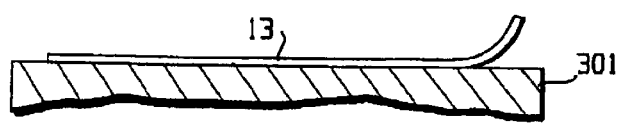
FIGS. 3A–3C show various installations of the sensing optical fiber of the preferred embodiment.
Figure 3B:
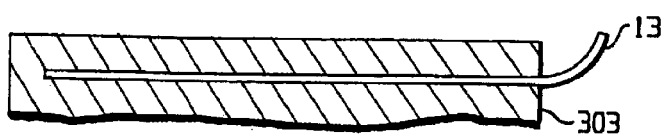
Figure 3C:
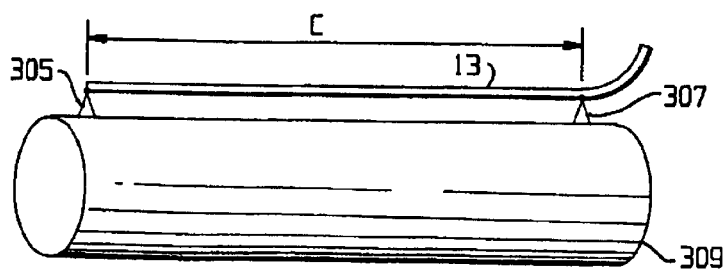

FIGS. 3A–3C show some examples. In FIG. 3A, the sensing fiber 13 is bonded to the exterior of a structure 301. As the structure 301 degrades over time, the sensing fiber 13 experiences a displacement. In FIG. 3B, the sensing fiber 13 is embedded in a structure 303, such as a dam. In FIG. 3C, the sensing fiber 13 is attached to two anchors 305, 307 on a structure 309, but is otherwise free from the structure 309. The distance between the anchors 305 and 307 defines the gage length C of the fiber 13. In any of FIGS. 3A–3C, the fiber 13 can be positioned in a pre-tensioned state such that contraction does not cause the fiber 13 to collapse if it is anticipated that a contraction of the structure 301, 303 or 309 may have to be detected.

Figure 4A:
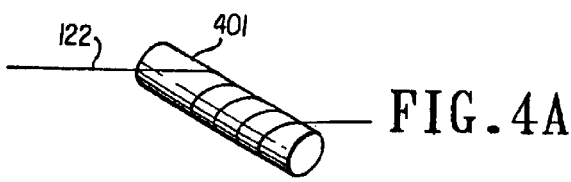
FIGS. 4A and 4B show two actuators for varying the optical path length of the adjustable length optical fiber.
Figure 4B:
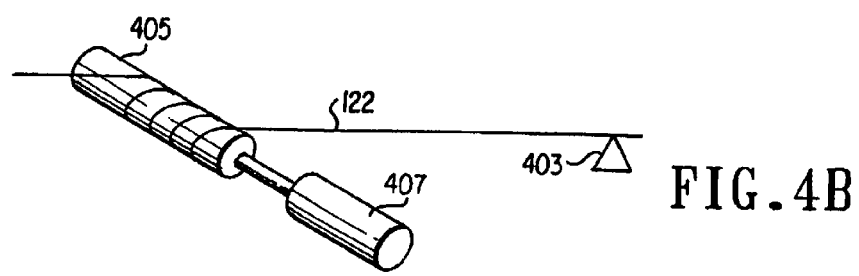

The gage length of the fiber 13 typically varies from less than ten centimeters to over a hundred meters. To permit measurements over such a gage length, the adjustable length optical fiber 122 (not shown in FIGS. 3A–3C) can be adjusted in any of several ways. For example, as shown in FIG. 4A, the fiber 122 is wrapped around a piezoelectric cylinder 401 which can be actuated to expand. Alternatively, as shown in FIG. 4B, the fiber 122 is suspended between an anchor 403 and a pulley 405 controlled by a motor 407. Other actuators, such as a linear motor, could be used instead.

The maximum displacement which the sensor can measure is determined by the length of the adjustable fiber 122 and the tensile breaking strength, i.e., the maximum strain or displacement which the fiber 122 can undergo. The longer the optical fiber, the greater the magnitude of the displacement for a given ultimate strain for the fiber material. For example, a typical single-mode optical fiber three meters in length has a maximum displacement of 60 mm. The rate at which the adjustable optical fiber 122 can be stretched or contracted determines the capacity of the sensor to measure dynamic displacement profiles.

The sensor can be modified to include multiple sensing fibers whose signals can be resolved through spatial division multiplexing. Each of the sensing fibers can be a long-gage fiber and can be used as in the first preferred embodiment. As an alternative, short gage lengths, such as a few centimeters, can be used. A single sensor can incorporate sensing fibers having long and short gage lengths.

Figure 5A:
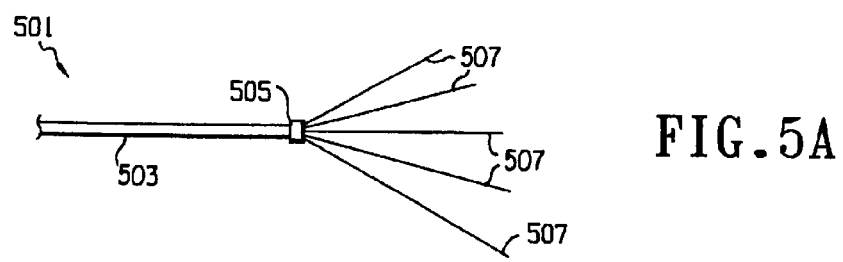
FIGS. 5A and 5B show two configurations of multiple sensing fibers.
Figure 5B:
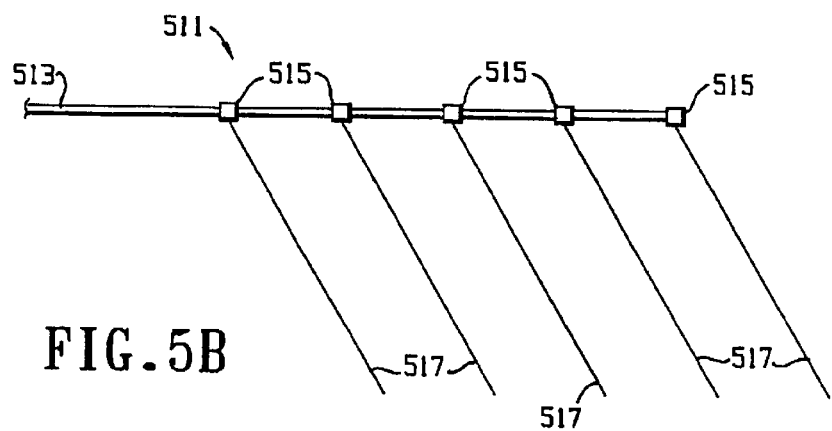

Two configurations of sensing optical fibers are shown in FIGS. 5A and 5B. FIG. 5A shows a configuration 501 in which a backbone optical fiber 503 is coupled through a coupler 505 to multiple sensing fibers 507 having different optical path lengths determined in a manner to be described shortly. FIG. 5B shows a configuration 511 in which a backbone optical fiber 513 is coupled through couplers 515 along its length to multiple sensing fibers 517. In the configuration 511, the spacing between adjacent ones of the couplers 515 supplies an optical path difference which can be used in multiplexing. Still other configurations could be devised; for example, a single optical fiber could have multiple semi-reflecting mirrors spaced along its length so that the interval between each two adjacent ones of the mirrors serves as a sensor. In either of the configurations, the coupler or couplers should provide some back reflection of the light, so that they either incorporate or take the place of the lead mirror 7. The sensing fibers 507 or 517 can be configured like the sensor fiber 13, ending in mirrors like the sensor mirror 15.

In the configuration of FIG. 5A, the sensing fibers 507 should have different optical path lengths, so that as the length of the adjustable length optical fiber 122 is adjusted, the interference fringes produced by light from the various sensing fibers 507 will not coincide or overlap. Thus, the values of the physical condition detected by the various sensing fibers 507 can be distinguished by spatial division multiplexing, so that neither time resolution on the order of a few nanoseconds nor an optical switch is required as in the prior art. In the configuration of FIG. 5B, the separation of the couplers 515 provides the necessary difference in optical path lengths.

The manner of determining the differences among the optical path lengths of the fibers 503 of FIG. 5A will now be described. As noted above, if a number N of sensing optical fibers area attached to a single backbone optical fiber, the sensing optical fibers have different optical path lengths to permit spatial division multiplexing. The difference in optical path length is given by $$\Delta = (\Delta_{max} - \Sigma_i L_i \epsilon_i)/(N-1),$$

where $\Delta_{max}$ is the maximum displacement of the adjustable length fiber 122, $\epsilon_i$ is the expected strain of the ith sensing fiber, $L_i$ is the optical path length of the ith sensing optical fiber, and i assumes integer values from 2 to N. The values of $L_i$ start with the length of the reference optical fiber and increase in increments of $\Delta$.

A numerical example will now be given. In the example, the maximum value of the deflection of the adjustable optical fiber is 30 mm. Five sensing fibers 507 are coupled to a single backbone fiber 503. The measured strain expected on the structure on which the configuration 501 is used is 200 microstrain, or in other words $200 \times 10^{-6}$ mm/mm, and is expected to be the same for all of the sensing fibers 507. The reference optical fiber has an optical path length of 1000 mm, so that the base line sensor is also 1000 mm in optical path length. The resulting difference A required to determine which of the sensing fibers 507 is associated with any particular interference peak is $\Delta \sim 7$ mm. Accordingly, the optical path lengths of the five sensing fibers 507 are 1000 mm, 1007 mm, 1014 mm, 1021 mm and 1028 mm.

Similar considerations apply to configurations such as that of FIG. 5B. Those skilled in the art who have reviewed the present disclosure will readily be able to design such configurations to permit spatial division multiplexing.

Test data from a sensor made in accordance with an embodiment of the present invention will now be set forth.

The test data demonstrate the ability of the sensor to measure deformations in a pipe, such as pre-buckling, buckling, internal pressure in the axial and circumferential directions and plastic deformations caused by loads exceeding the yield stress of the steel from which the pipe is made. Three sensor lengths are used: 10 cm, 1 m and 10 m. In addition, the ability of a long spiral wrap sensor is proved in terms of its ability to measure pressure loads in pipes.

The geometry and material properties of the steel pipe tested and the loads under which it was tested are set forth in the following table:

| Test loads applied to steel pipe | |
|---|---|
| Internal pressure (p) | 1550~1560 PSI |
| Axial compression (P) | $6 \times 10^5 \sim 8 \times 10^5$ lbs |
| Bending moment (M) | $3 \times 10^6 \sim 14 \times 10^6$ in-lbs |
| Steel pipe properties | |
| Length | ~72 in |
| Diameter | 19.4 in |
| Thickness | 0.46 in |
| Modulus of elasticity | $30 \times 10^6$ PSI |
| Poisson's ratio | 0.30 |

The following table summarizes the strains measured by two different lengths of fiber optic sensors: 1 m and 10 m (spiral wrap) under two different load conditions involving combinations of internal pressure and axial compression. The data show a good agreement with theoretical predictions based on well known stress/strain equations for pipes under those load conditions. The data show that both tension and compression can be accurately measured using the sensors under different load conditions.

Test results of internal pressure and axial compression

| | Axial strain ($10^{-6}$) | | Circumferential strain | | Spiral gages Strain |
|---|---|---|---|---|---|
| | | 1.0 m | ($10^{-6}$) | | ($10^{-6}$) |
| Load | Predicted | avg | Predicted | 1.0 m avg | 10 m avg |
| p = 1547 PSI<br>P = 12780 lbs | +202 | +258 | +929 | +934 | +933 |
| p = 1547 PSI<br>P = 6 × 10$^5$ lbs | −500 | −471 | +1140 | +943 | n/a |

In the above data, a positive (+) value indicates tension, while a negative (−) value indicates compression. The spiral gages measure primarily circumferential strain.

Figure 6:
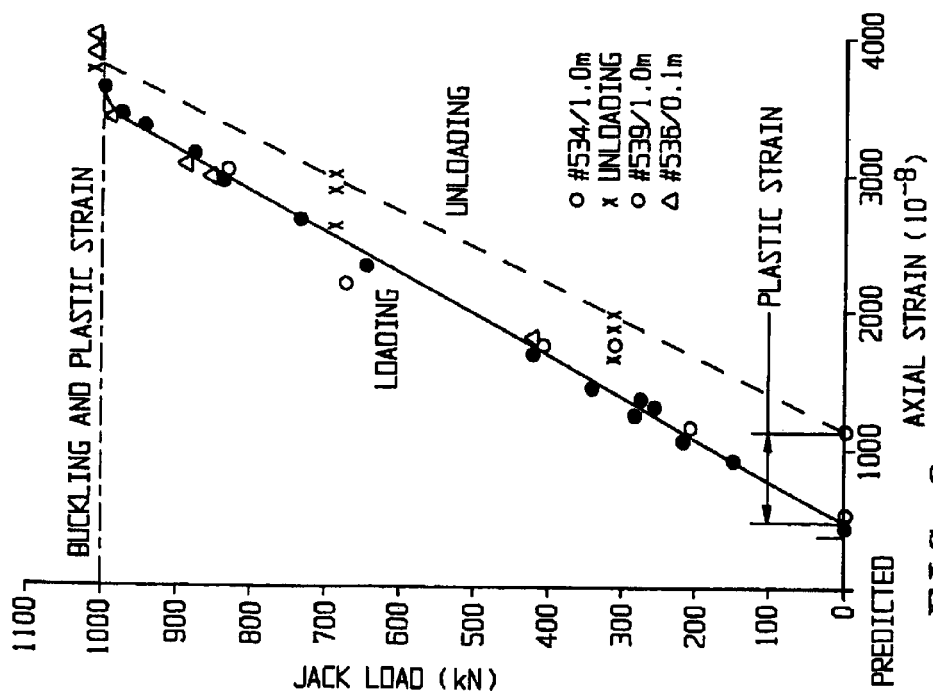

FIG. 6 shows a graph of data collected from two sensor lengths (1 m and 10 cm) measuring strains in the axial (longitudinal) direction of a pipe which is under internal pressure of 1547~1558 PSI and a pre-load of axial compression of 2690~3580 kN. The strains are plotted as a function of jack loads, i.e., a measure of the bending load applied to the pipe. The results show linear elastic behavior up to buckling, i.e., local collapse of a portion of the cylinder wall, associated with high compressive axial stresses due to the pre-load and jack-induced bending load. The results also show that upon unloading of the jack load, there was a permanent plastic deformation in the pipe, located in the buckled region.

Figure 7:
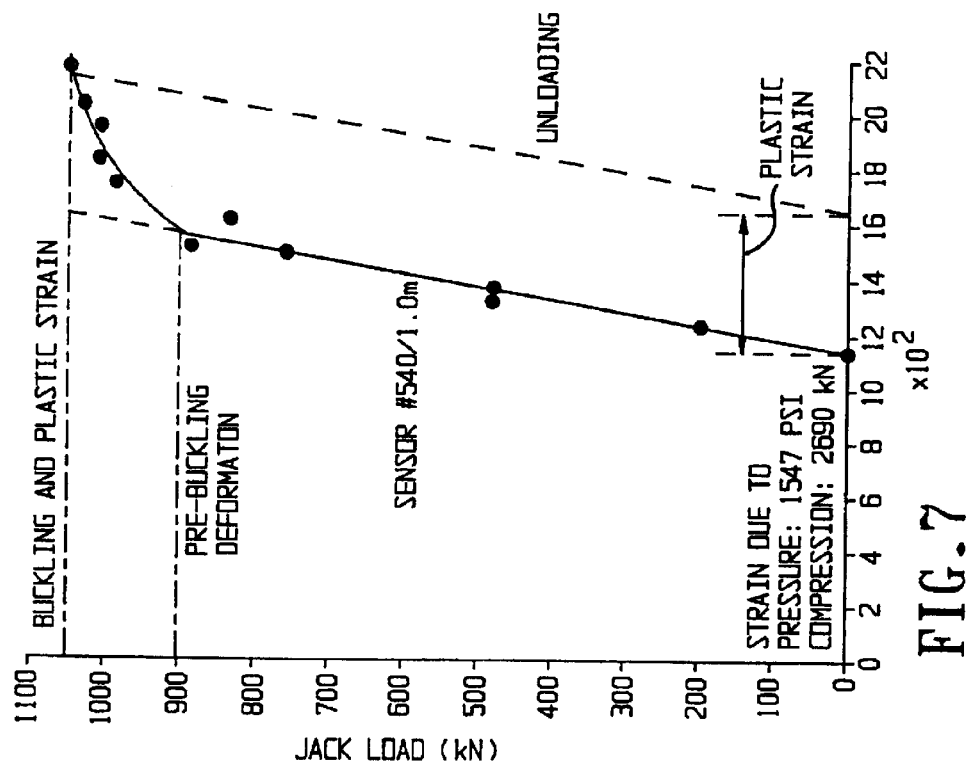
FIGS. 6 and 7 show graphs of experimental data.

FIG. 7 shows the hoop strain, i.e., the tensile strain in the circumferential direction, as measured by a 1 m sensor on a pipe which is under preloads of internal pressure and axial compression. The strain is plotted as a function of the jack load. Once again, the data show linear elastic behavior up to the buckling of the pipe. As the jack load is removed, the pipe evinces plastic deformation at the buckle location.

While a preferred embodiment and variations thereon have been described above in detail, those skilled in the art who have reviewed the present disclosure will readily appreciate that other embodiments can be realized within the scope of the present invention. For example, the optical path length of the adjustable fiber can be varied by electro-optic or magneto-optic techniques without a need for any moving parts. Also, the sensor 1 and the instrument 100 can be formed as a unit or can be separable; in the latter case, the instrument 100 can include a ferrule and connector for attachment to any sensor 1 or to multiple sensors 1. Therefore, the present invention should be construed as limited only by the appended claims.

We claim:

1. A method for sensing a physical condition, the method comprising:
   (a) generating light;
   (b) passing a first portion of the light through a first optical path comprising a first optical fiber, the first optical fiber being characterized by a first optical path length which changes in response to the physical condition;
   (c) passing a second portion of the light through a second optical path comprising a second optical fiber, the second optical fiber being characterized by a second optical path length which changes in a controllable manner;
   (d) causing the first portion of the light which has passed through the first optical path to interfere with the second portion of the light which has passed through the second optical path;
   (e) changing the second optical path length within the second optical fiber until step (d) results in an interference fringe having a maximum; and
   (f) determining the physical condition in accordance with a value of the second optical path length corresponding to the maximum of the interference fringe;
   wherein step (e) comprises changing a physical length of the second optical fiber through stretching the second optical fiber; and
   wherein the second optical fiber is wrapped around a pulley and secured to an anchor and is stretched by use of the pulley and the anchor.

2. A sensing system for sensing a physical condition, the sensing system comprising:
   a source of light;
   a first optical path comprising a first optical fiber, the first optical fiber being characterized by a first optical path length which changes in response to the physical condition;
   a second optical path comprising a second optical fiber, the second optical fiber being characterized by a second optical path length which changes in a controllable manner;
   at least one coupler for causing first and second portions of the light from the source to pass through the first and second optical paths and for causing the first portion of the light which has passed through the first optical path to interfere with the second portion of the light which has passed through the second optical path;
   a photodetector for detecting an interference fringe between the first and second portions of the light and for outputting a signal representing the interference fringe;

an actuator for changing the second optical path length within the second optical fiber until the interference fringe has a maximum; and a system, receiving the signal from the photodetector, for permitting a determination of the physical condition in accordance with a value of the second optical path length corresponding to the maximum of the interference fringe;

wherein the actuator changes a physical length of the second optical fiber through stretching the second optical fiber; and wherein the actuator comprises a pulley and an anchor, and wherein the second optical fiber is wrapped around the pulley and secured to an anchor and is stretched by use of the pulley and the anchor.

3. A sensing instrument for use with a sensor in sensing a physical condition, the sensing instrument comprising:

a source of light;

a reference optical fiber having a fixed optical path length;

an adjustable optical fiber having a controllable adjustable optical path length;

at least one optical coupler for causing the light from the source to pass through the sensor, receiving the light which has passed through the sensor, splitting the light which has passed through the sensor to the reference optical fiber and the adjustable optical fiber, and causing the light which has passed through the reference optical fiber to interfere with the light which has passed through the adjustable optical fiber;

a photodetector for detecting an interference fringe between the light which has passed through the reference optical fiber and the light which has passed through the adjustable optical fiber;

an actuator for changing the controllably adjustable optical path length within the adjustable optical fiber until the interference fringe has a maximum; and a system, receiving the signal from the photodetector, for permitting a determination of the physical condition in accordance with a value of the second optical path length corresponding to the maximum of the interference fringe;

wherein the actuator changes a physical length of the adjustable optical fiber through stretching the adjustable optical fiber; and wherein the actuator comprises a pulley and an anchor, and wherein the adjustable optical fiber is wrapped around the pulley and secured to the anchor and is stretched by use of the pulley and the anchor.

* * * * *